(12) United States Patent
Kelly et al.

(10) Patent No.: US 10,829,683 B2
(45) Date of Patent: Nov. 10, 2020

(54) PROCESS FOR MAKING AND SUPPLYING A HIGH QUALITY FRACTURING FLUID

(71) Applicants: Richard M Kelly, East Amherst, NY (US); Afshin Esmaeil Zadeh, Lubbock, TX (US); Mark K Weise, Harrisburg, PA (US)

(72) Inventors: Richard M Kelly, East Amherst, NY (US); Afshin Esmaeil Zadeh, Lubbock, TX (US); Mark K Weise, Harrisburg, PA (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 67 days.

(21) Appl. No.: 16/110,832

(22) Filed: Aug. 23, 2018

(65) Prior Publication Data
US 2018/0362835 A1    Dec. 20, 2018

Related U.S. Application Data

(62) Division of application No. 14/579,429, filed on Dec. 22, 2014, now Pat. No. 10,081,761.

(51) Int. Cl.
*C09K 8/66* (2006.01)
*C09K 8/80* (2006.01)

(52) U.S. Cl.
CPC ............... *C09K 8/665* (2013.01); *C09K 8/80* (2013.01)

(58) Field of Classification Search
None
See application file for complete search history.

(56) References Cited

U.S. PATENT DOCUMENTS

| | | | |
|---|---|---|---|
| 4,374,545 A | 2/1983 | Bullen et al. | |
| 4,480,696 A * | 11/1984 | Almond ............... | C09K 8/703 166/308.6 |
| 4,627,495 A | 12/1986 | Harris et al. | |
| 5,515,920 A * | 5/1996 | Luk ...................... | E21B 43/267 166/280.1 |

\* cited by examiner

*Primary Examiner* — Jeffrey D Washville
(74) *Attorney, Agent, or Firm* — Iurie A. Schwartz

(57) ABSTRACT

The present invention relates to a proppant laden fracture fluid having a Mitchell quality of at least 50% and fracturing a subterranean formation therewith.

6 Claims, 1 Drawing Sheet

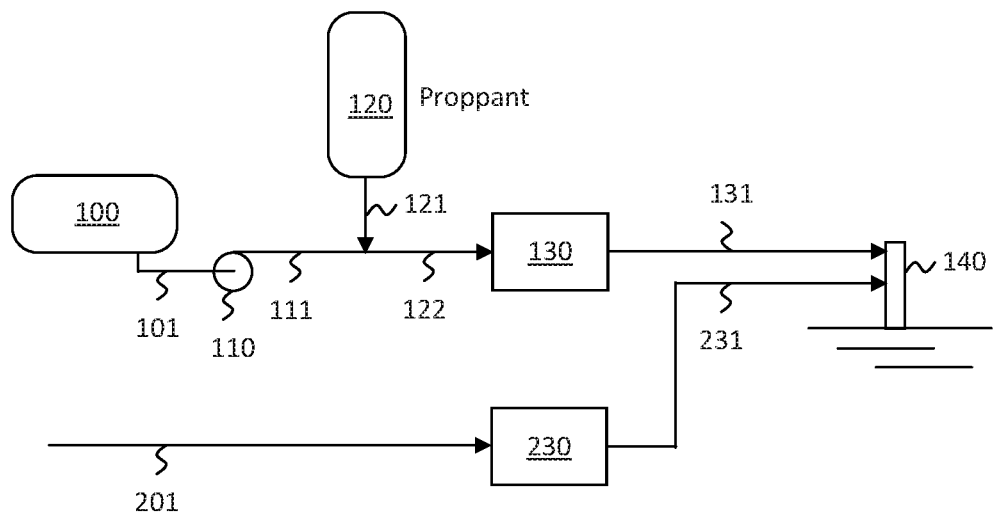

PROCESS FOR MAKING AND SUPPLYING A HIGH QUALITY FRACTURING FLUID

CROSS REFERENCE TO RELATED APPLICATION(S)

This application is a divisional application of allowed U.S. patent application Ser. No. 14/579,429 filed Dec. 22, 2014 and entitled PROCESS FOR MAKING AND SUPPLYING A HIGH QUALITY FRACTURING FLUID.

FIELD OF INVENTION

The present invention relates to a process for making a high quality fracturing fluid employed in the fracturing of a subterranean formation. More specifically, the invention relates to a proppant laden fracturing fluid including carbon dioxide and having a Mitchell quality of at least 50%.

BACKGROUND OF THE INVENTION

The use of liquid carbon dioxide ($CO_2$) as a fracture fluid for stimulating oil and gas containing formations is well known in the art. Utilization of liquid carbon dioxide ($LCO_2$) in the fracture treatment of oil and gas formations has advantages in water sensitive and low pressure formations. First, the use of $LCO_2$ enables a significant reduction in the water load (volume) utilized, which minimizes formation damage caused by the water. Second, the $LCO_2$ energizes the fracture fluid and promotes water flow-back through vaporization and expansion when pressure is removed from the fractured formation.

$LCO_2$ employed in fracture treatments is typically added to a high pressure stream, comprising water and proppant, at the well-head. With the aid of additives such as surfactants and gels, a stable emulsion of $LCO_2$ in water is formed at or near the addition point. The proppant is also dispersed within the water and together with the $LCO_2$ forms, what is known in the art, as the internal phase of the emulsion, with the water forming the external phase. The volume percent of the energizing component (the $LCO_2$), relative to the total liquid phase is commonly termed "the Mitchell quality", while the volume percent of the total internal phase (the $LCO_2$ and proppant) in the total fluid is commonly termed "the slurry quality". These qualities are equal when no proppant is present, and the Mitchell quality is lower than the slurry quality when proppant is present. $LCO_2$-based fracturing fluids with a Mitchell quality less than about 53% are commonly referred to as "energized", while those in the approximate range 53% to 95% are commonly referred to as "emulsions", although they are still energized by the $LCO_2$. These emulsions have an increased apparent viscosity due to the interaction of the discrete $LCO_2$ dispersed phases with each other. In a similar manner, the presence of proppant as part of the internal phase also contributes to this increase in apparent viscosity. Higher fracturing fluid viscosity can have several advantages such as improving proppant transport within the well bore and fractures, increasing fracture width and reducing fracture face leak-off.

One issue concerning conventional systems for forming high quality fracturing fluids, where proppant is added to the water side, is that as the Mitchell quality (or slurry quality) is increased above 50%, there is a relatively lower flow rate of water available to add the proppant to. This limits the proppant concentration that can ultimately be achieved in the high quality fracturing fluid, and can lead to more fracturing fluid being required to place a fixed amount of proppant through the fracture treatment. Consequently higher treatment costs are incurred with potentially increased damage to the formation through the additional water load.

U.S. Pat. No. 5,515,920 to Luk et al., discloses a method of creating a high proppant concentration, high $CO_2$ content fracturing stream, by simultaneously adding proppant to both the water side, and the $LCO_2$ side. This requires both a conventional proppant blender and a $LCO_2$ proppant blender to add proppant to the respective sides and as can be appreciated, the conventional blender will be somewhat underutilized for the purposes of proppant addition when making high quality fracturing fluids where the flow rate of water is relatively low compared to the flow rate of $LCO_2$.

Another issue with conventional systems for forming high quality fracturing fluids, where proppant is added to the water side, is that as the proppant concentration is varied during a treatment, the internal phase ratio (i.e., slurry quality) in the fluid will tend to vary and consequently, the viscosity of the fracturing fluid will also tend to vary. This can be a significant issue when the proppant concentration is progressively increased from low to high concentrations during the course of a fracture treatment. In order to maintain a substantially constant internal phase ratio (slurry quality), and therefore viscosity, the volume fraction of the $LCO_2$ in the fluid must be dynamically reduced to match the corresponding increase in proppant volume fraction. This requires (i) recognition of this issue on the part of the service provider performing the fracture treatment, and (ii) execution of a control scheme to accurately measure proppant concentration in the water side, with corresponding control of the flow rate of the $LCO_2$ side. As can be appreciated, this can be challenging given the relatively high flow rates of the various feed streams, somewhat rudimentary flow control associated with the high pressure pumpers that regulate the flow of the water and $CO_2$ sides, and the fact that other important parameters such as down-hole pressure are also changing during the course of the treatment.

U.S. Pat. No. 4,627,495 to Harris et al., recognizes this issue and discloses this method of controlling the volume of $LCO_2$ as the volume of proppant material added to the water side varies, but has the aforementioned challenges.

Thus, to overcome the disadvantages in the related art, one of the objects of the present invention is to form a high quality fracturing fluid having a higher concentration of proppant during the course of the fracture treatment than a conventional high quality fracturing fluid, and thus utilizing less water load.

It is another object of the invention, to admix a stream of high pressure liquid $CO_2$ and proppant with a high pressure stream comprising water to form a high quality fracturing fluid which is routed to an underground formation for the fracturing thereof and which has a higher level of proppant concentration during the course of the fracture treatment than a conventional high quality fracturing fluid.

It is a further object of the invention to provide a process for making a high quality fracturing fluid where, proppant is added to the $CO_2$ side only, thereby partitioning the components of the internal phase to be pressurized and flowed through one set of high pressure fracture pump(s), such that the volumetric flow of $CO_2$ is automatically decreased in proportion to the increase in the volumetric flow of proppant, when said high pressure $CO_2$ pump(s) are pumping a constant flow rate, thereby facilitating a relatively constant internal phase ratio (slurry quality) and, therefore, apparent viscosity in the high quality fracturing fluid.

Other objects and aspects of the present invention will become apparent to one skilled in the art upon review of the specification, drawings and claims appended hereto.

SUMMARY OF THE INVENTION

In one aspect of the invention, a process of making a high quality fracturing fluid with a high concentration of proppant is provided. The process includes (a) providing a first stream comprising liquid $CO_2$; (b) forming a second stream comprising water and other additives and raising the pressure to that required for a fracturing operation; (c) adding proppant only to the first stream comprising liquid $CO_2$ at a concentration up to 20 lbs/gal, and raising the pressure to that required for a fracturing operation; (d) admixing the first and second streams including the proppant of step (c), forming a high quality fracturing fluid having a Mitchell quality of at least 50%.

In another aspect of the invention a process of continuously making a high quality fracturing fluid with a high concentration of proppant, utilized in a fracturing operation, is provided. The process includes: (a) supplying a first stream containing liquid $CO_2$, optionally pressurizing the first stream of liquid $CO_2$ through at least one booster pump disposed in a first main conduit; (b) continuously adding proppant only to the first stream containing liquid $CO_2$ at a concentration up to 20 lbs/gal and routing the combined first stream through a high pressure pump disposed in the conduit to a wellhead; (c) continuously supplying a second stream containing water through at least one high pressure pump and routing said second stream to the well head; (d) admixing the first and second streams forming a high quality fracturing fluid having a Mitchell quality of at least 50%.

In another aspect of the invention a process of making a high quality fracturing fluid with a high concentration of proppant and a substantially constant slurry quality is provided. The process includes (a) forming a first stream comprising liquid $CO_2$ having a first fixed flow rate; (b) forming a second stream comprising water having a second fixed flow rate; (c) admixing the first and second streams to form a high quality fracturing fluid having a Mitchell quality of at least 50% (d) adding proppant to the first stream comprising liquid $CO_2$ at a concentration of up to 20 lbs/gal, in volume substitution for the liquid $CO_2$, such that the first fixed flow rate, that now comprises $LCO_2$ and proppant, is maintained at a substantially constant value.

BRIEF DESCRIPTION OF THE DRAWING

The above and other aspects, features, and advantages of the present invention will be more apparent from the following drawing, wherein:

FIG. 1 is a schematic representation of a process for making a high quality fracture fluid where the proppant is introduced into the $LCO_2$ stream prior to mixing with the water stream at the well head.

DETAILED DESCRIPTION OF THE INVENTION

The present invention addresses the aforementioned disadvantages of adding proppant to the water side when forming a high quality fracture fluid, or via the water side and the $LCO_2$ side when forming a high quality fracturing fluid. Proppant is instead added via the $LCO_2$ side only, which is then combined with the water side. In this manner, water sensitive formations can be treated by providing a high proppant concentration, high quality fracturing fluid, wherein a lower water load is added to the formation. Additionally, the apparent viscosity of the fluid can be more easily controlled by maintaining a constant slurry quality, which is facilitated by addition of the proppant to the $CO_2$ side. "A high quality fracturing fluid" as utilized herein refers to a fracturing fluid having at least 50% by volume $LCO_2$, (i.e. a Mitchell quality of at least 50%).

In accordance with the present invention a method of forming a high quality fracturing fluid having a Mitchell quality of at least 50%, wherein proppant is added to the $LCO_2$ side at concentrations up to about 20 lbs/gal is provided. Preferably the present invention forms a high quality fracturing fluid having a Mitchell quality of 50 to 95%, and a proppant concentration in the range 0 to 18 lbs/gal, such that the slurry quality does not exceed approximately 95%. More preferably the present invention forms a high quality fracturing fluid having a Mitchell quality of 70 to 90%, and a proppant concentration in the range 0 to 10 lbs/gal, such that the slurry quality does not exceed approximately 90%. The present invention may form a high quality fracturing fluid having an initial Mitchell quality of 90% and an initial proppant concentration of 0 lbs/gal, and a final Mitchell quality of approximately 88% and final proppant concentration of approximately 3.75 lbs/gal. In this case the slurry quality remains constant at approximately 90%.

The invention, described in the embodiments below, provides a simpler method of controlling the internal phase concentration (slurry quality) of a high quality fracturing fluid through combination of the two internal phase components, i.e. addition of the proppant to the $LCO_2$ stream, prior to combination with the pressurized water stream.

Turning to FIG. 1, an exemplary embodiment of the process and apparatus is described. Liquid $CO_2$ ($LCO_2$) is stored as a bulk refrigerated liquid in at least one insulated storage tank(s) 100, at a pressure in the approximate range 150 to 400 psig, and with a temperature at or below its boiling point. This is typically in the range −40 to 20° F. depending on pressure (i.e., sub-cooled to saturated). A stream of $LCO_2$ is fed to booster pump 110 via conduit 101, where its pressure is raised by about 50 psi or more prior to being fed to high pressure fracture pump(s) 130 via conduit 111. Booster pump 110 ensures that the pressure of the $LCO_2$ stream passing to high pressure fracture pump(s) is sufficiently above its vapor pressure to mitigate cavitation or vapor lock in those pump(s). One or more of the various desired chemical additives can be introduced into the $LCO_2$ stream prior to admixing this stream at the well-head. For instance, the $LCO_2$ stream may be thickened with a gelling agent or thickening additive which enhances the ability of the $LCO_2$ to carry proppant through the various surface equipment prior to admixing at the well-head.

One or more high pressure fracture pump(s) 130 raise the pressure of the stream to a value typically in the range 2,000 to 10,000 psig, depending on the needs of the particular fracture treatment. The pressurized $LCO_2$ stream then passes to well-head 140 via main conduit 131. Proppant, which may be a graded silica sand, or other suitable material, is stored in batch blender vessel 120 together with liquid $CO_2$, and is metered from batch blender vessel 120 via conduit 121 into conduit 111. It will be understood by those skilled in the art that proppant with different densities may be utilized, which would affect the loading (lbs/gal) of the $LCO_2$ stream discussed herein. The proppant is stored at substantially the same pressure and temperature as the $LCO_2$ passing through the booster pump in order to effect transfer of the proppant into the $LCO_2$ and minimal addition of heat to that LCO$_2$ stream, and although not shown, this can be conveniently achieved by addition of LCO$_2$ to batch blender vessel 120 before and during the course of proppant addition, although other means are also possible. Metering from batch blender vessel 120 may be achieved with an auger, eductor, progressive cavity pump, valve or other suitable means. However, in another exemplary embodiment multiple batch blender(s) 120 may be sequentially used and refilled when off-line in order to enable continuous proppant addition without batch limitation. Alternatively, batch blender 120 is replaced with a solids pump, to enable continuous addition of precooled proppant without batch limitation. In the present invention the term "continuous" is employed to define a process, or equipment that can continuously input, or accept input material and that can continuously output product material without reliance on a significant inventory of material contained in that equipment or within that process. For purposes of clarity, the term "continuous" is differentiated from the term "batch", where a process or equipment relies upon a significant inventory of material contained in that equipment or process to supply an output product, and is not continuously fed with input material that then transfers to the output product. As will be appreciated by those skilled in the art, continuous processes or equipment may change rates or compositions and can stop and start intentionally or unintentionally, however these modes of operation are still considered to be within the above definition of continuous.

In parallel, a water feed stream 201 is fed to high pressure fracture pump(s) 230, which raise the pressure of the water to substantially the same pressure as the pressurized LCO$_2$ stream. The pressurized water stream is then fed to the well-head via conduit 231, whereupon it combines with the high pressure LCO$_2$ stream to form an emulsion, which then passes through the well-bore to the formation for fracture treatment thereof. This combination may instead occur in a conduit prior to the well head if desired. Although not shown, various chemicals are usually added to water feed stream 201 via chemicals-add trucks and hydration units for example. These chemicals may include, but are not limited to a surfactant which lowers the interfacial tension between the water and LCO$_2$ in the emulsion; a gel which thickens the water and helps stabilize the emulsion; clay control agents which minimize clay swelling and migration due to water contact; biocides, scaling control agents, and corrosion inhibitors.

The fracture treatment schedule will usually include a pad stage, where clean (proppant-free) fluid initiates and starts to propagate fractures. In this case no proppant is added via batch blender vessel 120, and the fracture fluid will comprise LCO$_2$, water and the aforementioned chemicals. The fracture design will dictate the total fluid flow rate and fluid quality, and high pressure pumps 130 and 230, control the flow rates of pressurized LCO$_2$ and pressurized water streams respectively, to satisfy these two parameters. Once the fracture starts to propagate, it is desired to start to place proppant in the fracture, and proppant is metered out from batch blender vessel 120 at a rate that will create the desired concentration in the high quality fracture fluid. The proppant concentration in the fracture fluid will usually be increased in small increments such as 0.5 or 1.0 lbs/gal or more, and when proppant is added to the fracture fluid, it takes up additional volume, for instance 5 lbs/gal of silica sand occupies approximately 19 volume % of the fracturing fluid.

During a fracture treatment, it is often desirable to maintain a constant fracture fluid rate (for example, 35 bpm), and a constant viscosity in the well bore (for example 100 cP or more with an emulsion). The present invention automatically achieves this by addition of the proppant to the LCO$_2$ side, since as proppant is added to the low pressure LCO$_2$, it displaces the equivalent volume of LCO$_2$. And when the volumetric flow rate through high pressure fracture pump(s) 130 and 230 is held constant, the proppant laden emulsion formed in the well bore will have a constant internal phase concentration over time despite the fact that the proppant concentration is rising over time.

In an alternative embodiment, LCO$_2$ storage vessel(s) 100 are replaced by an on-site LCO$_2$ generations means, or a pipeline supply of CO$_2$ that is liquid or liquefied prior to use. In another alternative embodiment the high pressure LCO$_2$ stream and high pressure water stream are combined in a conduit prior to being fed to the wellhead.

In yet another exemplary embodiment, LCO$_2$ is replaced at least in part by another liquefied gas, such as liquid nitrogen or liquefied petroleum gas, or the water stream is replaced at least in part by another atmospheric pressure liquid, such as propylene glycol, a mineral oil or a vegetable oil.

The present invention will be further described with respect to the following examples, which are not to be construed as limiting the invention, but rather to further illustrate the comparative differences between the conventional process and the process and apparatus of the present invention Comparative Examples Three examples are described for the treatment of a water sensitive formation penetrated by a well bore, each utilizing a high quality fracture fluid comprising CO$_2$, water and silica sand proppant. The formation is treated at a depth of 7,000 ft, via a vertical well, and has a permeability of about 0.01 milli-Darcy, a porosity of 15 percent, with a bottom hole temperature and pressure of approximately 150° F. and 5,800 psig respectively. The well bore is contained using 5.5 inch diameter casing with perforations centered at 7,000 ft depth.

The first example, descriptive of the present invention, utilizes a 90% slurry quality fluid where proppant is added to the CO$_2$ side; whereas the second example utilizes a 90% slurry quality fluid where proppant is added to the water side (i.e., a conventional set-up), and the third example (also a conventional set-up) utilizes a 70% slurry quality fluid, where proppant is also added to the water side. In all three examples, the treatments are designed to place 60,000 lbs of proppant, with the slurry quality (volume percent internal phase) held constant throughout the treatment. In each example, requisite chemicals are added to the water side and may include for example 2 weight % potassium chloride for clay control, 2 gpt (gallons per thousand) of an alpha olefin sulfonate surfactant, 22 lbs per thousand gallons of carboxymethyl hydroxypropyl guar gelling agent, as well as a biocide and gel breaker.

Referring to Table 1, in Example 1 the formation is treated with a constant rate of 35 barrels per minute (bpm) of fluid and a constant slurry quality of 90%, based on bottom hole conditions. The treatment starts with a pad of 9,000 gallons of fluid pumped into the formation with no proppant in order to initiate the fracture. Next, proppant is introduced via the fluid starting at a concentration of 0.25 pounds per gallon (ppg) of fracture fluid and increasing to 3.75 ppg by the end of the treatment. This is achieved by addition of pressurized, precooled proppant to the CO$_2$ side of the fracture fluid at concentrations starting at approximately 0.3 ppg and finishing at approximately 4.3 ppg, based on surface conditions. As can be appreciated, only modest concentrations of proppant are required to be added to the $CO_2$ side in order to produce the desired proppant concentrations in the fracture fluid, since relatively little dilution occurs when the water side is added to the fracture fluid. From Table 1, it can be seen that as the proppant concentration increases during the treatment, the Mitchell quality naturally falls whilst the slurry quality remains constant. This is because the total fracture fluid rate is held constant at 35 bpm, and the proppant is added at the expense of $CO_2$ in order to maintain a constant slurry quality. When proppant is added to the $CO_2$ side as in this case, the combined $CO_2$ and proppant rate remains approximately constant through the treatment, as does the water rate, despite increasing proppant concentration, which aids in controlling the desired constant slurry quality.

With reference to Table 4, which tallies the main fluid components, it can be seen that after the treatment time of 29.5 minutes the total water load added to the formation is 4,400 gallons, with 154 tons of $CO_2$ utilized.

In Comparative Example 2, and with reference to Table 2, the formation is treated at a constant rate of 65 bpm of fluid and a constant slurry quality of 90%, based on bottom hole conditions, with proppant being added to the water side of the fracture fluid. The treatment again starts with a pad of 9,000 gallons of fluid pumped into the formation with no proppant in order to initiate the fracture. Next, proppant is introduced via the fluid starting at a concentration of 0.25 ppg of fracture fluid and increasing only to 1.25 ppg by the end of the treatment. The proppant concentration in the fracture fluid is limited to 1.25 ppg since it is accomplished by addition to the water side of the fracture fluid, which is in this case is a much lower proportion of the total fracture fluid rate (10 volume %). Twelve and a half pounds/gal (12.5 ppg) represents approximately 36 volume % of the combined stream and much higher loadings are harder to effectively transport in the water side without significant risk, although it may be possible to add approximately 20 ppg when sufficient flow rate and gel is used to aid in proppant transport. In Comparative Example 2 a higher treatment rate of 65 bpm is used over a total period of 30.7 mins to compensate for the lower proppant loading, and at the end of the fracture treatment results in a total water load added to the formation of 8,100 gallons, which is over 80% more than in Example 1. Also 309 tons of $CO_2$ are required compared to 154 in Example 1. From Table 2 it can also be seen that the $CO_2$ rate must be decreased and the water rate increased during the course of the treatment in order to maintain a constant slurry quality, which adds control complexity.

In Comparative Example 3, and with reference to Table 3, the formation is again treated at a constant rate of 35 barrels per minute of fluid but at a lower constant slurry quality of 70%, based on bottom hole conditions, with proppant being added to the water side of the fracture fluid, as in Comparative Example 2. The treatment again starts with a pad of 9,000 gallons of fluid pumped into the formation with no proppant in order to initiate the fracture. Next, proppant is introduced via the fracture fluid starting at a concentration of 0.25 ppg of fracture fluid and increasing only to 4.0 ppg by the end of the treatment. The proppant concentration in the fracture fluid is limited to 4.0 ppg since it is accomplished by addition to the water side of the fracture fluid, which is in this case is still a lower proportion of the total fracture fluid rate (30 volume %). Thirteen and a third lbs/gal (13.3 ppg) represents approximately 37 volume % of the combined stream and again, much higher loadings are harder to effectively transport in the water side without significant risk. In Comparative Example 3 though, a treatment rate of 35 bpm can be used over a total period of 27.8 mins, but at the end of the fracture treatment results in a total water load added to the formation of 11,400 gallons, which is over 150% more than in Example 1. In this case though 113 tons of $CO_2$ are utilized compared to 159 in Example 1. From Table 3 it can again be seen that the $CO_2$ rate must be decreased and the water rate increased during the course of the treatment in order to maintain a constant slurry quality, which adds control complexity.

From these examples it can be seen that addition of proppant to the $CO_2$ side of the high quality fracture fluid results in significantly lower water load being added to the formation compared to when proppant is added to the water side, and also facilitates simpler control of constant slurry quality as the proppant concentration increases, since the flow rates of the $CO_2$ side and water side remain relatively constant throughout.

TABLE 1

Example 1, Proppant Added to $CO_2$ Side - 90% Slurry Quality

| | | Bottom Hole Conditions | | | | Surface Conditions | | | |
|---|---|---|---|---|---|---|---|---|---|
| | | | | | | | | $CO_2$ and | |
| | | | | | | $CO_2$ | | | |
| Stage (#) | Time (mins) | Fluid Rate (bpm) | Slurry Quality (%) | Proppant loading (ppg) | Mitchell Quality (%) | $CO_2$ Rate (bpm) | Proppant loading (ppg) | Proppant Rate (bpm) | Water Rate (bpm) |
| 1 | 6.1 | 35 | 90% | 0.00 | 90.0 | 31.4 | 0.0 | 31.4 | 3.5 |
| 2 | 8.2 | 35 | 90% | 0.25 | 89.9 | 31.0 | 0.3 | 31.4 | 3.5 |
| 3 | 10.3 | 35 | 90% | 0.50 | 89.8 | 30.6 | 0.6 | 31.4 | 3.5 |
| 4 | 12.4 | 35 | 90% | 0.75 | 89.7 | 30.2 | 0.8 | 31.4 | 3.5 |
| 5 | 14.5 | 35 | 90% | 1.00 | 89.6 | 29.9 | 1.1 | 31.4 | 3.5 |
| 6 | 17.1 | 35 | 90% | 1.50 | 89.3 | 29.1 | 1.7 | 31.3 | 3.5 |
| 7 | 19.7 | 35 | 90% | 2.00 | 89.1 | 28.5 | 2.3 | 31.4 | 3.5 |
| 8 | 22.1 | 35 | 90% | 2.50 | 88.9 | 27.8 | 2.8 | 31.4 | 3.5 |
| 9 | 24.8 | 35 | 90% | 3.00 | 88.7 | 27.2 | 3.4 | 31.4 | 3.5 |
| 10 | 27.2 | 35 | 90% | 3.50 | 88.4 | 26.6 | 4.0 | 31.4 | 3.5 |
| 11 | 29.5 | 35 | 90% | 3.75 | 88.3 | 26.3 | 4.3 | 31.4 | 3.5 |

TABLE 2

Comparative Example 2, Proppant Added to Water Side - 90% Slurry Quality

| | | Bottom Hole Conditions | | | | Surface Conditions | | | |
|---|---|---|---|---|---|---|---|---|---|
| | | | | | | | | Water | Water and |
| Stage (#) | Time (mins) | Fluid Rate (bpm) | Slurry Quality (%) | Proppant loading (ppg) | Mitchell Quality (%) | $CO_2$ Rate (bpm) | Water Rate (bpm) | Proppant loading (ppg) | Proppant Rate (bpm) |
| 1 | 3.3 | 65 | 90% | 0.00 | 90.0 | 58.2 | 6.5 | 0.0 | 6.5 |
| 2 | 7.0 | 65 | 90% | 0.25 | 89.9 | 57.5 | 6.4 | 2.5 | 7.2 |
| 3 | 11.1 | 65 | 89% | 0.50 | 88.8 | 56.9 | 6.4 | 5.0 | 7.8 |
| 4 | 16.8 | 65 | 90% | 0.75 | 89.6 | 56.3 | 6.3 | 7.5 | 8.4 |
| 5 | 23.3 | 65 | 90% | 1.00 | 89.5 | 55.7 | 6.2 | 10.0 | 9.0 |
| 6 | 30.7 | 65 | 90% | 1.25 | 89.4 | 55.1 | 6.1 | 12.5 | 9.6 |

TABLE 3

Comparative Example 3, Proppant Added to Water Side - 70% Slurry Quality

| | | Bottom Hole Conditions | | | | Surface Conditions | | | |
|---|---|---|---|---|---|---|---|---|---|
| | | | | | | | | Water | Water and |
| Stage (#) | Time (mins) | Fluid Rate (bpm) | Slurry Quality (%) | Proppant loading (ppg) | Mitchell Quality (%) | $CO_2$ Rate (bpm) | Water Rate (bpm) | Proppant loading (ppg) | Proppant Rate (bpm) |
| 1 | 6.1 | 35 | 70% | 0.00 | 70.0 | 24.4 | 10.5 | 0.0 | 10.5 |
| 2 | 7.8 | 35 | 70% | 0.25 | 69.7 | 24.1 | 10.4 | 0.8 | 10.8 |
| 3 | 9.9 | 35 | 70% | 0.50 | 69.3 | 23.8 | 10.3 | 1.7 | 11.0 |
| 4 | 12.1 | 35 | 70% | 1.00 | 68.6 | 23.3 | 10.0 | 3.3 | 11.6 |
| 5 | 13.9 | 35 | 70% | 1.50 | 68.1 | 22.8 | 9.8 | 5.0 | 12.1 |
| 6 | 15.7 | 35 | 70% | 1.75 | 67.6 | 22.6 | 9.7 | 5.8 | 12.3 |
| 7 | 17.9 | 35 | 70% | 2.00 | 67.3 | 22.3 | 9.6 | 6.7 | 12.5 |
| 8 | 20.3 | 35 | 70% | 2.50 | 66.5 | 21.9 | 9.4 | 8.3 | 13.0 |
| 9 | 23.0 | 35 | 70% | 3.00 | 65.9 | 21.5 | 9.3 | 10.0 | 13.4 |
| 10 | 25.4 | 35 | 70% | 3.50 | 65.2 | 21.0 | 9.1 | 11.7 | 13.9 |
| 11 | 27.8 | 35 | 70% | 4.00 | 64.6 | 20.6 | 8.9 | 13.3 | 14.3 |

TABLE 4

Cumulative Results for Examples 1, and Comparative Examples 2, and 3

| Example | Proppant Added to: | Slurry Quality (%) | Total Water Load (gal) | Total $CO_2$ (tons) | Total Proppant (lbs) |
|---|---|---|---|---|---|
| 1 | CO2 side | 90% | 4,400 | 154 | 60,000 |
| 2 | Water side | 90% | 8,100 | 309 | 60,000 |
| 3 | Water side | 70% | 11,400 | 113 | 60,000 |

Although various embodiments have been shown and described, the present disclosure is not so limited and will be understood to include all such modifications and variations as would be apparent to one skilled in the art.

We claim:

1. A process of continuously making a high quality fracturing having a high concentration of proppant, utilized in a fracturing operation, comprising:
   (a) continuously supplying a first stream containing liquid $CO_2$
   (b) continuously adding proppant only to the first stream containing liquid $CO_2$ at a concentration up to 20 lbs/gal, and routing the combined first stream through a high pressure pump disposed in the conduit to a well head;
   (c) continuously supplying a second stream containing water through at least one high pressure pump and routing said second stream to the well head;
   (d) admixing the first and second streams forming a high quality fracture fluid having a Mitchell quality of at least 50%.

2. The process of claim 1, wherein additives are admixed to the either the first or second stream.

3. A high quality fracturing composition having a Mitchell quality of about 50-95%, a proppant loading of about 0-18 lb/gal such that the slurry quality does not exceed approximately 95%.

4. The high quality fracturing composition of claim 3, having a Mitchell quality of about 70-90%, a proppant loading of about 0-10 lb/gal such that the slurry quality does not exceed approximately 90%.

5. The high quality fracturing composition of claim 3 having a 90% slurry quality and a proppant loading of 3.75 lbs/gal.

6. A process of controlling the manufacturing of a high quality fracturing fluid stream, comprising:
   (a) providing a first stream comprising liquid $CO_2$;
   (b) forming a second stream comprising water and other additives;
   (c) adding proppant only to the first stream comprising liquid $CO_2$ of step (a), and volumetrically displacing the liquid $CO_2$ in an equal amount to the volumetric amount of proppant added;

(d) admixing the proppant and liquid $CO_2$ stream of step (c) provided at a constant flow rate with the second stream provided at a constant flow rate forming a high quality fracturing fluid having a Mitchell quality of at least 50%.

* * * * *